United States Patent
Linnebur et al.

(10) Patent No.: US 7,055,619 B2
(45) Date of Patent: Jun. 6, 2006

(54) SEED BOOT ATTACHMENT

(75) Inventors: Mark Anthony Linnebur, Byers, CO (US); Lloyd Linnebur, Byers, CO (US)

(73) Assignee: Mark Linnebur, Byers, CO (US)

( * ) Notice: Subject to any disclaimer, the term of this patent is extended or adjusted under 35 U.S.C. 154(b) by 166 days.

(21) Appl. No.: 10/776,373

(22) Filed: Feb. 11, 2004

(65) Prior Publication Data

US 2005/0172871 A1    Aug. 11, 2005

(51) Int. Cl.
    *A01B 15/00*    (2006.01)
(52) U.S. Cl. .................. 172/772.5; 172/733; 172/769; 111/152; 111/124
(58) Field of Classification Search .............. 111/186, 111/187, 188, 195, 152, 174, 123, 124; 172/721, 172/722, 724, 726, 728, 730, 733, 727, 769, 172/772, 772.5
    See application file for complete search history.

(56) References Cited

U.S. PATENT DOCUMENTS

| | | | |
|---|---|---|---|
| 362,598 A | 5/1887 | Billups | |
| 475,461 A * | 5/1892 | Miller | 172/722 |
| 673,135 A | 4/1901 | Denny | |
| 1,328,375 A | 1/1920 | Griffice | |
| 1,982,746 A * | 12/1934 | Kovar | 172/724 |
| 2,159,652 A | 5/1939 | Brunner | |
| 2,337,777 A * | 12/1943 | Seaholm | 172/722 |
| 2,469,044 A * | 5/1949 | Lane | 172/194 |
| 2,684,617 A | 7/1954 | Johnston | |
| 2,690,113 A * | 9/1954 | Altgelt et al. | 172/720 |
| 2,889,788 A | 6/1959 | Van Dorn | |
| 3,752,236 A | 8/1973 | Foster | |
| 3,854,429 A | 12/1974 | Blair | |
| 3,895,589 A * | 7/1975 | Garner et al. | 111/186 |
| 4,141,301 A | 2/1979 | Coldren | |
| 4,373,455 A | 2/1983 | Friggstad | |
| 4,473,016 A | 9/1984 | Gust | |
| 4,565,141 A | 1/1986 | Kopecky | |
| 4,607,581 A * | 8/1986 | Kopecky | 111/152 |
| 4,608,933 A | 9/1986 | Wyrill, III | |
| 4,674,419 A * | 6/1987 | Kopecky | 111/73 |
| 4,685,843 A | 8/1987 | Kelm | |
| 4,691,645 A * | 9/1987 | Anderson | 111/155 |
| 4,711,187 A | 12/1987 | Schultz | |
| 4,770,112 A | 9/1988 | Neumeyer | |
| 4,817,727 A * | 4/1989 | Mielke et al. | 172/192 |
| 4,825,782 A * | 5/1989 | Mikkelsen | 111/123 |
| 5,001,995 A * | 3/1991 | Mikkelsen | 111/124 |
| 5,033,398 A | 7/1991 | Froc | |
| 5,417,171 A * | 5/1995 | Poirier et al. | 111/149 |
| 5,562,055 A * | 10/1996 | Petersen | 111/195 |
| 6,059,047 A | 5/2000 | Schimke | |
| 6,178,901 B1 | 1/2001 | Anderson | |

(Continued)

FOREIGN PATENT DOCUMENTS

DE        3526256 A1 *    1/1987

(Continued)

*Primary Examiner*—Victor Batson

(57) ABSTRACT

This invention is an apparatus for planting seed and injecting dry fertilizer (dry granular material) with an air seeder, chisel plow or cultivator with air seeder components while at the same time tiling the soil. The apparatus consists of a vertically oriented conveyance tube that directs the granular material into a groove formed by the apparatus by means of a knife mounted to the underside of a triangular configured bracket which also serves as the mounting structure. The seed and fertilizer are injected into the groove, below the compacted sweep layer (formed by the sweep shovel) and next to firm soil that does not dry out as would the loose soil above the sweep layer.

2 Claims, 4 Drawing Sheets

U.S. PATENT DOCUMENTS

| | | | |
|---|---|---|---|
| 6,332,412 B1 * | 12/2001 | Swab et al. | 111/152 |
| 6,357,368 B1 * | 3/2002 | Swab et al. | 111/152 |
| 6,363,871 B1 | 4/2002 | Puetz et al. | |
| 6,405,665 B1 | 6/2002 | Henry et al. | |

FOREIGN PATENT DOCUMENTS

| | | | |
|---|---|---|---|
| DE | 3628910 | * | 3/1988 |
| FR | 2541846 | * | 9/1984 |

* cited by examiner

SEED BOOT ATTACHMENT

CROSS REFERENCE TO RELATED APPLICATIONS

Air Seeder Attachment for a V-Blade Plow that was Expressed Mailed on 26 Jan. 2004.

BACKGROUND

1. Field of Invention

This invention relates to an agricultural implement for planting seed and injecting dry fertilizer (dry granular material) while at the same time tilling the soil.

2. Discussion of Prior Art

Historically in agriculture, planting the crop has been a separate operation from the tillage operation which is used to kill unwanted weeds and grasses. For many years (since the late 1800's), there have been attempts to try to combine the tilling operation with the planting operation but these attempts have never really caught on. Several reasons for this lack of success has been: 1) the tilling operation does not provide a good seedbed for the seed or 2) the equipment to do this has been costly, requiring completely new implements.

Currently, seed boots are being manufactured which attach to a chisel shank, in which a small sweep shovel is also attached. U.S. Pat. No. 5,033,398 currently covers such a seed boot and manufacturers such as Flexi-Coil and John Deere manufacture similar boots. This type of configuration does accomplishes the objective of getting the seed and/or fertilizer in the ground while at the same time tilling the soil. Unfortunately, the seed is placed on firm, compacted soil, called a sweep layer, and is subsequently covered up by loose soil then followed by a presswheel to firm the soil above the seed. This sweep layer is not an ideal seedbed because the roots are inhibited from establishing themselves downward through the sweep layer. Also, with the loose soil left on top and/or adjacent to the seed, the adjacent soil usually dries out beside the seed which in turn attracts moisture away from the seed instead of directing moisture towards the seed. Needless to say, this type of planting operation is inferior to planting the seed inside a narrow groove with loose sidewalls adjacent to the seed similar to most seed boots that do not combine the tilling operation.

In 1987, another type of implement was patented (U.S. Pat. No. 4,770,112), in which the planting and tilling operations seemed to be adequately combined. The design has a narrow point extending vertically lower than the wings of a sweep shovel in which a narrow groove is formed and then followed behind by the sweep shovel in order to undercut the adjacent soil killing any unwanted grasses or weeds. This invention has some major pitfalls. It is a unique invention that does not attach to any other implements except to the implement as part of the invention and it does not use any other standard, commercially available sweep shovels. Therefore, the farmer must purchase costly new equipment instead of using standard equipment they may already have. The Deere and Company invention also directs the seed sideways which places the seed on the top of the sweep layer instead of into the narrow groove. The groove is formed for the placement of fertilizer below and away from the seed so that more fertilizer can be injected into the soil during this operation than could be done otherwise if the seed and fertilizer were placed (banded) together.

Relatively narrow knives have also been used in agriculture for forming a narrow groove in the soil in which liquid or gaseous fertilizer is injected into the ground. Usually, there is a separate implement that only has knives attached to it and is not suited for tilling the ground at the same. In 1979, an invention, U.S. Pat. No. 4,141,301, was designed to both fertilize and till at the same time but it does not appear suited for planting and does not use commercially available sweep shovels.

SUMMARY

The present invention is an apparatus that attaches to the shank of an air seeder, chisel plow or cultivator which uses shanks, as shown in FIG. 1. The apparatus is used in conjuction with the other components necessary for an "Air Seeder" which include the seed and fertilizer (granular material) storage tank; the air pump, or fan, that blows the granular material through plastic and/or metal ducting. Flexi-Coil and John Deere, and many other manufacturers, for example, currently manufacture implements which use shanks as part of their air seeders.

The seed boot attachment 20 is comprised of: a) a triangular configured mounting bracket 21; b) a vertically oriented conveyance tube 22; c) a replacable knife 24 that penetrates the soil (more specifically the sweep layer) which provides a groove in the soil, which becomes a suitable bed for the seed to be deposited into; and d) and a mounting tab 23 attached to the underside of the bracket 21 in which the knife 24 is mounted to.

The seed boot attachment 20 is located, such that the shank 10, and the sweep shovel 12 go through the untitled soil first, thereby, protecting it from extraordinary wear and abrasion. The conveyance tube 22 is also conformed at the exit of the tube, such that the seed is directed precisely into the groove created by the knife 24 and below the firm compacted layer of soil.

OBJECTS AND ADVANTAGES

This present invention the "Seed Boot Attachment" allows one to plant a crop with precision and in an ideal seedbed, while at the same time tilling the ground at planting time, all in one operation and can be attached to varying styles of air seeders, chisel plows or cultivators that can be turned into an air seeder.

Modern farming techniques have changed in recent times and are as varied in farming as they are in about any profession. New conservation tillage techniques have come along which include "Minimum-Till" or "No-Till", which leave more residue on top of the soil in order to protect the soil from erosion and evaporation. Chemicals are being used instead of tilling the soil in order to control unwanted weeds and grasses. And the air seeder is often used for planting in conservation tillage practices because of its ability to go through more residue than would a conventional grain drill.

Small grains are more and more being planted with "Air Seeders". The air seeder utilizes the conventional tilling unit (which includes either a shank and a point or a planter unit which include opener discs, both of which penetrate the soil for the placement of seed) along with a storage tank that meters the seed and fertilizer, an air pump or fan that blows and distributes the seed and fertilizer through a manifold system that directs the seed to the individual conventional tilling units, described earlier. These tilling units are usually spaced from 6 to 30 inches apart forming parallel rows in the field. For example, the crop may be planted in 12 inch rows or 12 inch spacings.

There are drawbacks to conservation tillage practices. One major aspect is each chemical operation is much more expensive than killing the weeds or grasses using conventional tilling techniques. Many farmers often decide that the cost of one more chemical application just cannot be justified and usually till the ground instead, right before planting. Even though this is less expensive than chemical means, it still requires an additional operation over the ground requiring additional labor and longer hours in the field. It can also cause the loose, aerated soil that was tilled up to dry out leaving less than ideal planting conditions, if not planted within a just a few days.

The combination of the last tillage operation and planting have been combined before. There are several seed boots being manufactured that attach to the back side of a shank while a small sweep shovel is attached to the front side of the shank. However, the grain is deposited on top of the sweep layer, with loose soil above it, which would probably dry out soon, as discussed above. These planting conditions, at least in our farming operation, were found to be inadequate and unreliable.

Deere and Company has the patent on an invention that had the potential to solve the problem of an inadequate seedbed. However, their invention does not direct the seed into the narrow groove below the sweep layer. Instead the groove is for the placement of fertilizer and the seed is directed sideways on top of the sweep layer.

Also, in the current farming environment, farmers must make their operations as efficient as possible using the same equipment for various operations. Most farmers just cannot afford any additional, costly equipment.

This present invention solves these problems. The Seed Boot Attachment is designed to break through the sweep layer leaving a groove as the seed bed. The seed is injected into the groove, below the compacted sweep layer, where the roots can propogate downward more easily. The seed is also next to the firm moist soil that does not readily dry out. In fact, any dry soil that may have fallen in the groove is moistened by the adjacent moisture (if any) of the firm soil.

This invention is also designed to be attached to existing brands of equipment and to be used with common, commercially available sweep shovels manufactured by various companies.

The Seed Boot Attachment was also designed with ease of maintenance in mind. The attachment utilizes only the mounting bolts that were used for the sweep shovel and the replacable knife 24 is also easily interchangeable.

It is, therefore, the principle object of this invention to provide an effective and efficient way of combining the last tillage operation prior to planting and the planting operation. This will be a significant cost and labor savings for the farmer.

Another objective of this invention is to convey dry fertilizer along with the seed for incorporation into the soil during the planting operation.

Another objective of this invention is to not interfere with the tilling process for the purpose of killing unwanted weeds or grasses.

Another objective of this invention is to attach to various types of seeding equipment manufactured by various companies or to attach to conventional tillage equipment that can be converted into an air seeder.

Another objective of this invention is to be simple enough such that a farmer with adequate abilities can manufacture replacement parts or repair worn or broken parts.

Another objective of this invention is to attach varying styles and sizes of commercially available sweep shovels to the shank to fit particular farming objectives.

Other objects will be in part apparent and in part pointed out specifically herinafter in connection with the description of the drawings that follow.

LIST OF REFERENCE NUMERALS

10 Shank
12 Sweep shovel
20 Seed Boot Attachment
21 triangular configured bracket
22 vertically oriented conveyance tube
23 mounting tab
24 Knife

DESCRIPTION OF INVENTION

Figure 1:
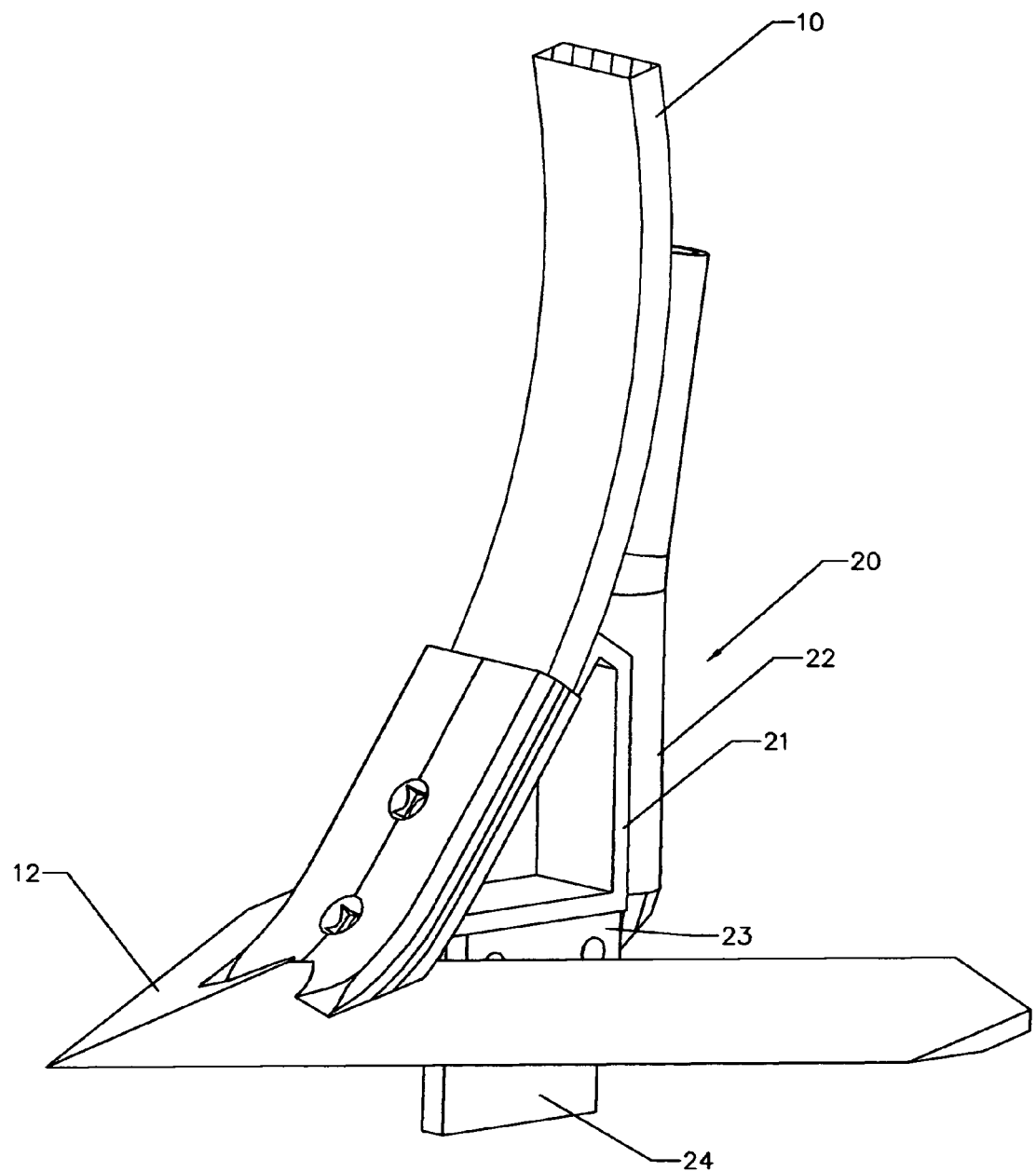
FIG. 1 is an isometric view in an upright position looking rearward showing the lower portion of a common shank and the sweep shovel along with the Seed Boot Attachment slightly hidden behind.
Figure 2:
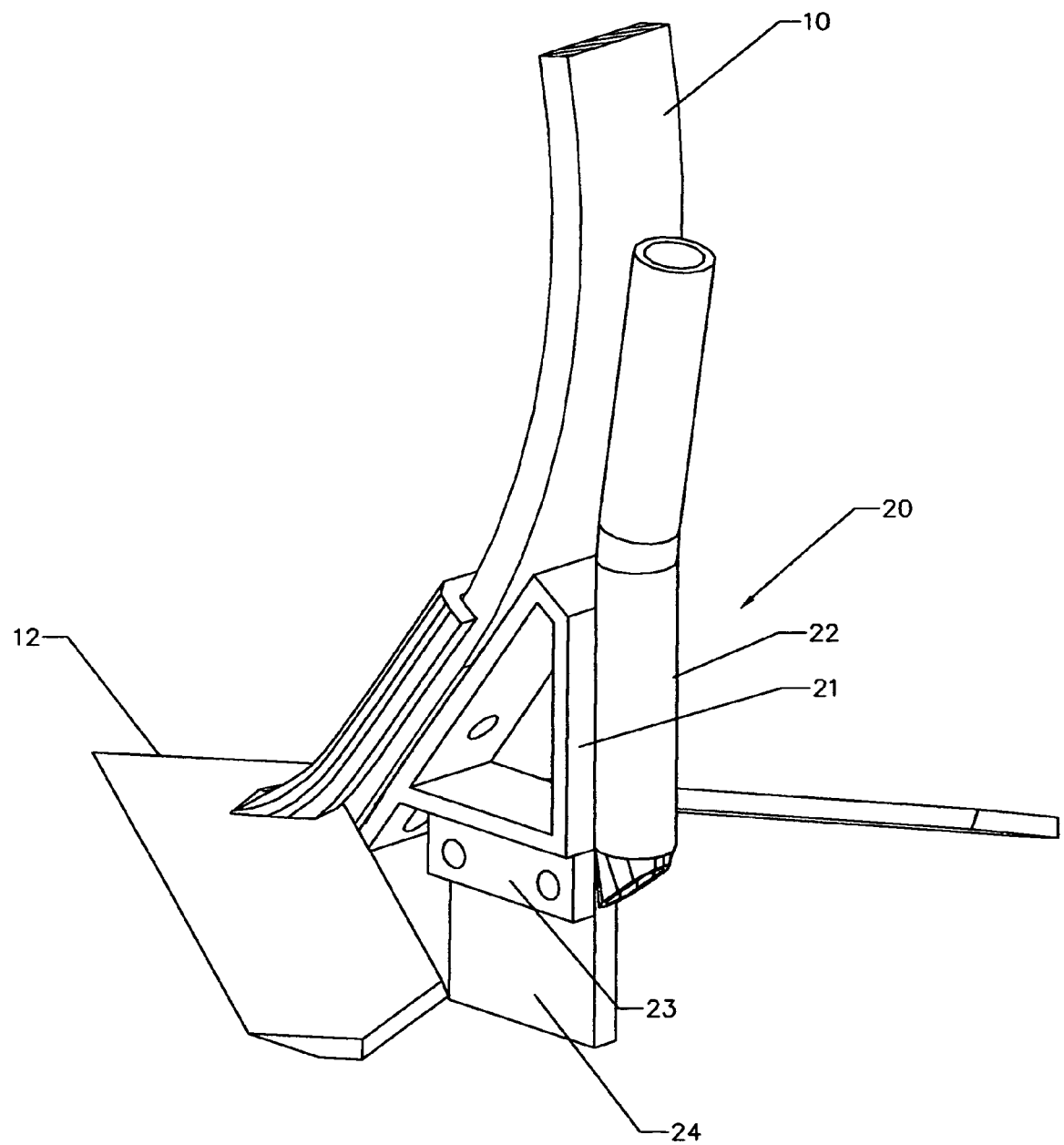
FIG. 2 is an isometric view in an upright position looking forward showing the lower portion of a common shank and the sweep shovel along with the Seed Boot Attachment.
Figure 3:
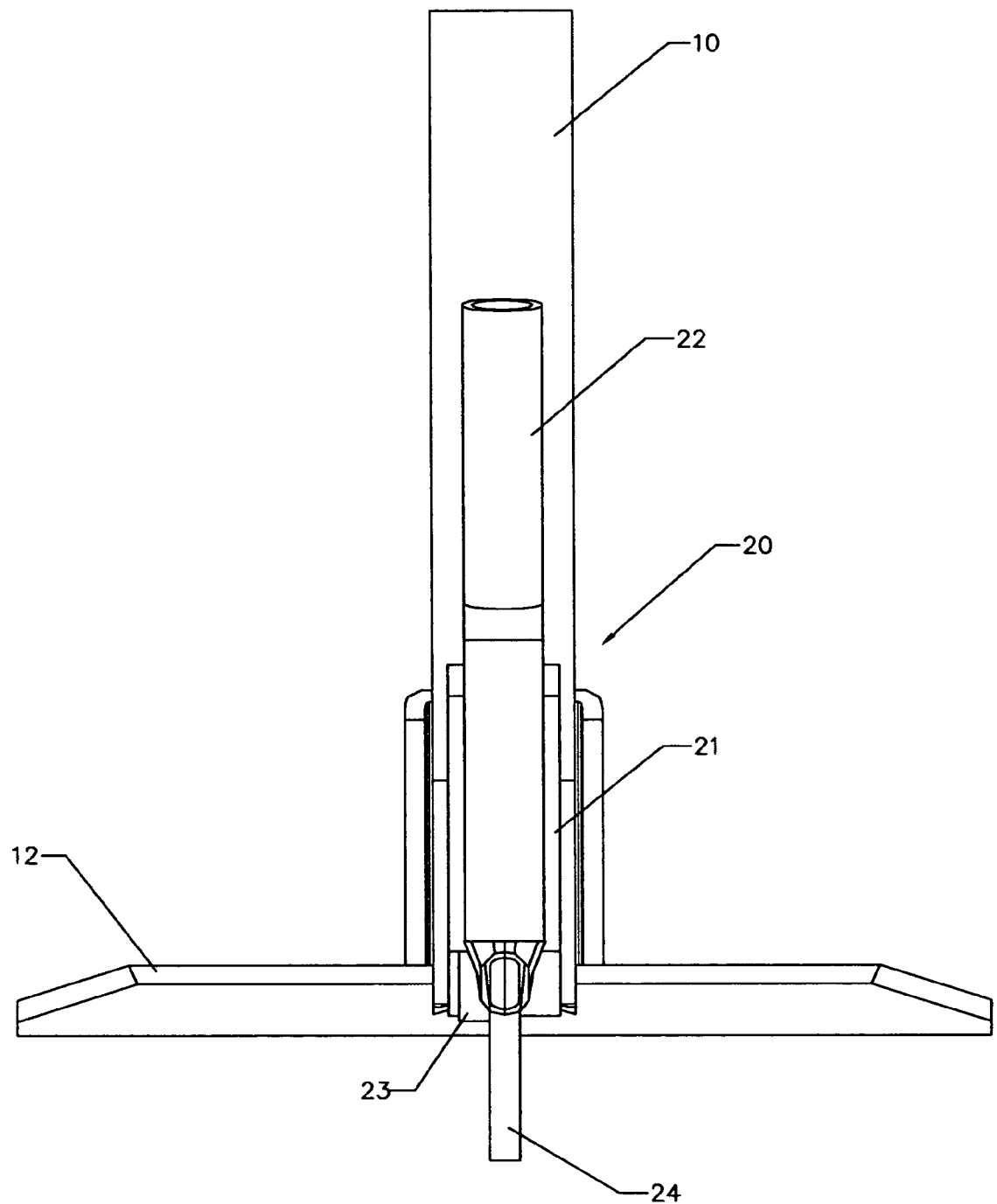
FIG. 3 is a rear elevation view looking in the direction of travel showing the elevation of the knife below the elevation of the sweep shovel (which forms the sweep layer).
Figure 4:
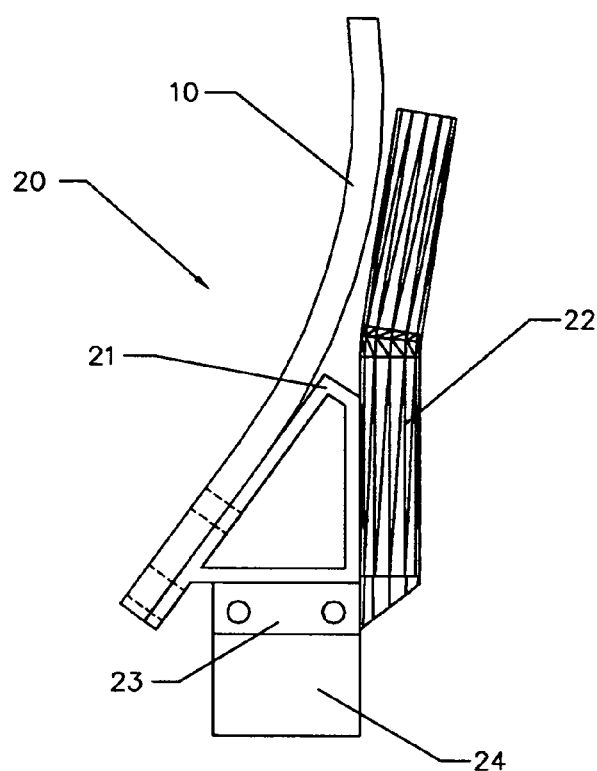
FIG. 4 is a side elevation view showing the lower portion of a common shank and the Seed Boot Attachment but does not include the sweep shovel.
Figure 5:
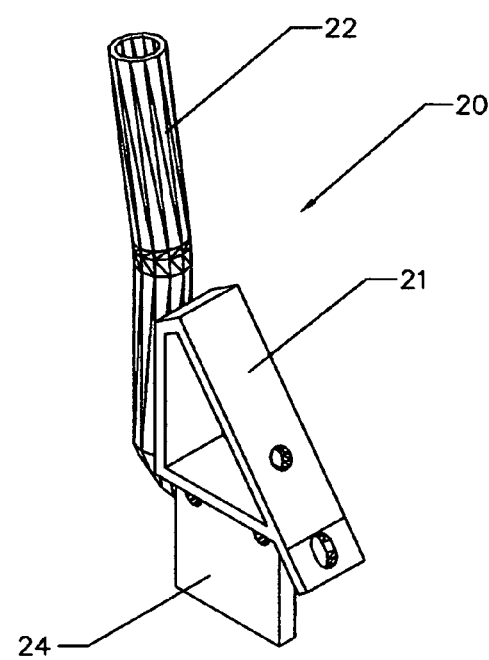
FIG. 5 is an isometric view in an upright position of only the Seed Boot Attachment.
Figure 6:
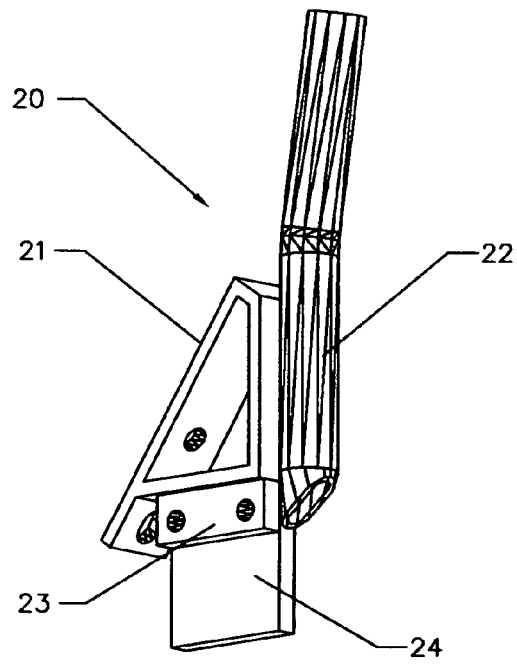
FIG. 6 is an isometric view looking from the underside of only the Seed Boot Attachment.
Figure 7:
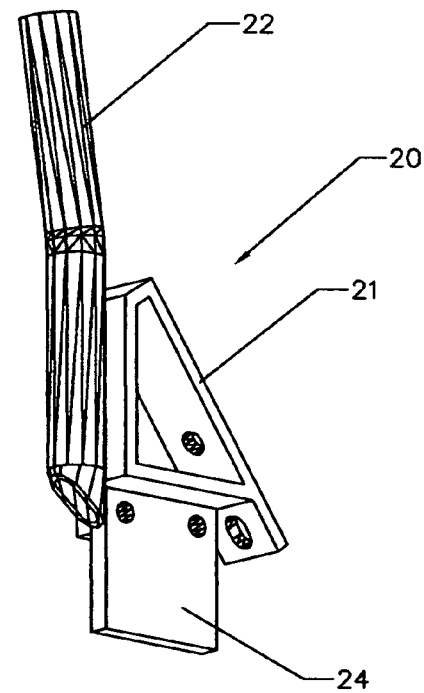
FIG. 7 is an isometric view at a different angle looking from the underside of only the Seed Boot Attachment.

Referring now to the drawings for a detailed description of the invention, reference numeral 10 identifies a conventional shank and 12 identifies a common, commercially available sweep shovel as shown best in FIGS. 1 and 2. These units may be of varying styles and sizes. The sweep shovel is configured such that it has a downwardly inclined angled flange on the leading edge and is bolted to the shank by an upwardly turned flange with two holes in order to mount it to the shank. The shank, is used to mount each individual unit onto the frame of the overall air seeder implement, chisel plow or cultivator, consisting of several units in a staggered side by side arrangement, which in turn is pulled along by an agricultural tractor, which has not been illustrated.

The novel aspects of the Seed Boot Attachment does not lie with the air seeder implement, chisel shank, or sweep shovel but rather, in the attachment itself, indicated broadly by the numeral 20. In the particular form shown, it can be seen that a vertically oriented conveyance tube 22 is attached to a triangular configured bracket 21 that attaches to the shank 10. A mounting tab 23 is fixed to the underside of the bracket in which the replacable knife 24 is attached. These components are shown best in FIGS. 4 through 7.

The vertically oriented conveyance tube 22 is positioned directly behind the shank 10 such that it is protected from abrasive soil. When in use, the upper part of this monolithic tube is connected to plastic tubing (which leads from the air seeding components, which are not shown). As the tube extends downward it makes a slight bend such that it is separated from the shank adequately in order to attach the plastic tubing, as shown best in FIG. 4. At the bottom end, or the exit, the tube transitions from a circular cross section to an elliptical shape so as to direct the seed precisely down into the narrow groove formed by the knife 24. The exit of the tube is also tapered from directly behind the knife upward to the trailing edge of the exit, see FIG. 4. This configuration prevents soil from jamming up into the exit of the tube. Only one tube is shown, but more than one may be attached to satisfy different farming objectives.

The triangular configured bracket 21 mounts the apparatus 20 to the shank 10. It is shaped so as to provide structural strength and stability to withstand the forces present as the knife 24 penetrates through untilled soil. It is also shaped so as to attach to various styles and sizes of shanks. The bracket is shown with two holes, nominally ½", located on the forward, slanted portion of the bracket spaced so as to match the spacing of the holes of various styles and sizes of shanks and sweep shovels. The same bolts that attach the sweep shovel to the shank are used also to attach the seed boot. These bolts may need to be longer such that they extend through the bracket sufficiently to get a nut on the end but not too long so that the bolt extends into the bottom portion of the bracket or into the knife.

The mounting tab 23 is attached to the underside of the bracket 21. It serves the purpose of attaching the knife 24. The tab is located directly in front of the exit of the conveyance tube 22 and is oriented parallel to the direction of travel. It is shown to have two holes where the knife is attached. However, other mounting schemes may be used for the knife.

The knife 24 attaches onto the mounting tab 23. It is shown to be rectangular and approximately ⅜" wide by 2½" from front to back and extending approximately 3" downward so that it extends approximately 1" below the bottom of the sweep layer. These dimensions may vary, especially if differering depths of groove are required under varying soil conditions. The shape of the knife may also vary having possible trapezoidal shapes or curved shapes. The knives are replacable since they are under very abrasive conditions when penetrating the sweep layer.

OPERATION OF INVENTION

The "Air Seeder", chisel plow or cultivator with air seeding components is comprised of several individual shanks 10 mounted in a staggered side by side arrangement. And attached to each shank would be a sweep shovel 12 so as to penetrate the soil, together the shank and the sweep shovel will be called a chisel unit. As the implement is pulled along by means of an agricultural tractor, the depth of penetration is controlled by the operator. When functioning, the sweep shovels 12 run under the surface of the ground slicing underneath several inches of soil which also slices off the roots of unwanted weeds or grasses as well as loosening the soil from around those same roots. What is left is a layer of loose aerated soil above the level that the sweep shovel was set at. Below that level is a firm, compacted layer of soil, called a sweep layer. The Seed Boot Attachment runs in conjunction with chisel unit, so as the chisel unit slices forward through the soil, the knives 24 are penetrating through the sweep layer and forming grooves from one inch to several inches deep. Seed and/or dry fertilizer are then injected into the groove before the loose soil, which is flowing over and around the chisel unit, covers up the seed. This results in several regularly spaced transverse rows.

The air seeder components operate as follows. The storage tank holds the granular material (including seed and dry fertilizer). As the entire machinery is pulled forward by means of an agricultural tractor the granular material is metered out into a manifold system which has pressurized air flowing through it by means of an air pump, or fan. As the granular material is metered, it is caught in the air flow stream and travels through a network of plastic and metal ducting to another manifold where the granular material is dispersed further to individual plastic tubing which lead to each of the the vertically oriented conveyance tubes 21, as part of the present invention 20. The granular material then travels through the conveyance tube finally exiting in a vertically downward direction, being injected into the groove formed by the knife 24.

As with most planter or air seeder machinery, a series of presswheels (one presswheel per transverse row), not shown, are attached to and precisely follow the transverse rows formed by the chisel units and seed boot attachments, in order to compact soil around the seed to provide good seed to soil contact. Which in turn, if the soil is moist, allows the seed to sprout.

CONCLUSION, RAMIFICATIONS, AND SCOPE OF INVENTION

As one can imagine, this invention may very well be a great cost savings to many farmers who have incorporated the air seeder, the chisel plow or cultivator as part of their farming operation. The "Seed Boot Attachment" provides an efficient and reliable way of planting wheat and applying dry fertilizer in one pass, while at the same time doing the last operation over the field to kill any unwanted weeds or grasses. It saves labor, tractor time and expenses and the cost of purchasing additional planting equipment. There are seed boots attachments on the market now that allow the combination of tilling and planting, but these attachments do not solve the problem of placing the seed on top of the sweep layer, which is a poor seed bed. This invention solves that problem and provides an ideal seedbed while at the same time tilling the soil.

The scope of the invention should be determined not by the embodiment illustrated, but by the appended claims and their legal equivalent.

What is claimed is:

1. A seed boot for use in combination with an air seeder, chisel plow or cultivator having air seeder components capable of injecting dry granular material vertically downward into a groove in the soil and including a plurality of chisel shank units, comprising;
    a. a vertically oriented conveyance tube having an inlet connectable to a source of granular material transported by means of pressurized air, and an exit which is formed for precise granular material injection and formed to prevent soil from jamming up into said exit and
    b. a triangular configured bracket comprising a forward slanted portion, a rearward portion extending substantially vertically during operation and a bottom portion extending substantially horizontally during operation, with the bracket providing structural support and further including a means of directly mounting said bracket to at least one said plurality of chisel shank units by means of mounting holes in said forward slanted portion of said bracket, said conveyance tube being mounted directly to said rearward substantially vertical portion of said bracket and c. a replaceable knife mounted directly to a vertically extending mounting tab, said mounting tab directly mounted to an underside of said bottom portion of said bracket, said replaceable knife vertically aligned with said bracket and positioned adjacent a front of said conveyance tube exit during operation, said knife configured to penetrate a compacted layer formed by a sweep shovel, which in turn forms said groove below said compacted layer.

2. The seed boot as set forth in claim 1, mounted to said at least one chisel shank unit, in combination with a sweep shovel having wings with top edges, said sweep shovel being mounted to a front side of said at least one chisel shank unit.

* * * * *